United States Patent Office 3,761,403
Patented Sept. 25, 1973

3,761,403
SIMULTANEOUS EXTRACTION OF MIXTURES OF SUBSTITUTED AND UNSUBSTITUTED AROMATICS
Mark A. Plummer, Littleton, Colo., assignor to Marathon Oil Company, Findlay, Ohio
Filed Jan. 24, 1972, Ser. No. 220,075
Int. Cl. C10g 21/04
U.S. Cl. 208—317
11 Claims

ABSTRACT OF THE DISCLOSURE

Mixtures of sulfolane ("tetramethylene sulfone"), tetrahydrofurfuryl alcohol, and water have been discovered to be superior solvents for simultaneous extraction of feed streams containing both substituted and unsubstituted aromatics.

BACKGROUND OF THE INVENTION

Field of the invention

The invention teaches an improvement in hydrocarbon purification, generally classified in U.S. Patent Office Class 208, Minerals; Processes and Products, subclass 317.

Description of the prior art

U.S. Pat. 3,539,503 to Benham, Plummer, and Norton teaches a simultaneous dual extraction process utilizing two separate hydrocarbon feeds, one of which is a mixture of light aromatic hydrocarbons with light paraffinic hydrocarbons and the other of which is a mixture of heavy aromatic hydrocarbons with heavy paraffinic hydrocarbons, using an extraction solvent containing dimethylformamide, tetramethylene sulfone, and water.

U.S. Pat. 3,317,422 to Benham teaches the closed-loop multiple extraction of aromatic hydrocarbons from hydrocarbon mixtures using a common selective solvent containing furfural, furfuryl alcohol, and water.

U.S. Pat. 3,539,504 teaches furfural solvent systems which may optionally contain auxiliary solvents including water and sulfolanes (see col. 3, lines 47+).

U.S. Pat. 3,567,626 also teaches said solvent systems (see col. 4, line 36) and mentions that the sulfolane and water are present in amounts of from 1–20 weight percent or more based on the amount of the furfural.

U.S. Pat. 2,671,753 extracts with tetrahydrofurfural alcohol solvent containing a small amount of water to increase the solvent selectivity (see col. 1, lines 12–21).

The apparatus of the aforementioned U.S. Pat. 3,539,-503 is suitable for use with the present invention. However, it has been found that reactor flooding occurs when dimethylformamide, sulfolane, and water solvents are used with hydrocarbon feeds containing substantial amounts of unsubstituted aromatics. None of the above prior art patents teach any solution to this problem.

SUMMARY OF THE INVENTION

General statement of the invention

According to the present invention, good extraction (without substantial extractor flooding) is obtained when feeds containing substantial amounts of unsubstituted aromatic hydrocarbons are extracted using as the extraction solvent, mixtures comprising tetrahydrofurfural alcohol, tetramethylene sulfone, and water.

Utility of the invention

This invention permits flexibility of refining operations with the attendant economic advantages in capital investment and operating expense and extends these advantages to hydrocarbon feeds containing substantial quantities of unsubstituted aromatic hydrocarbons.

DESCRIPTION OF THE PREFERRED EMBODIMENTS

Figure 1:
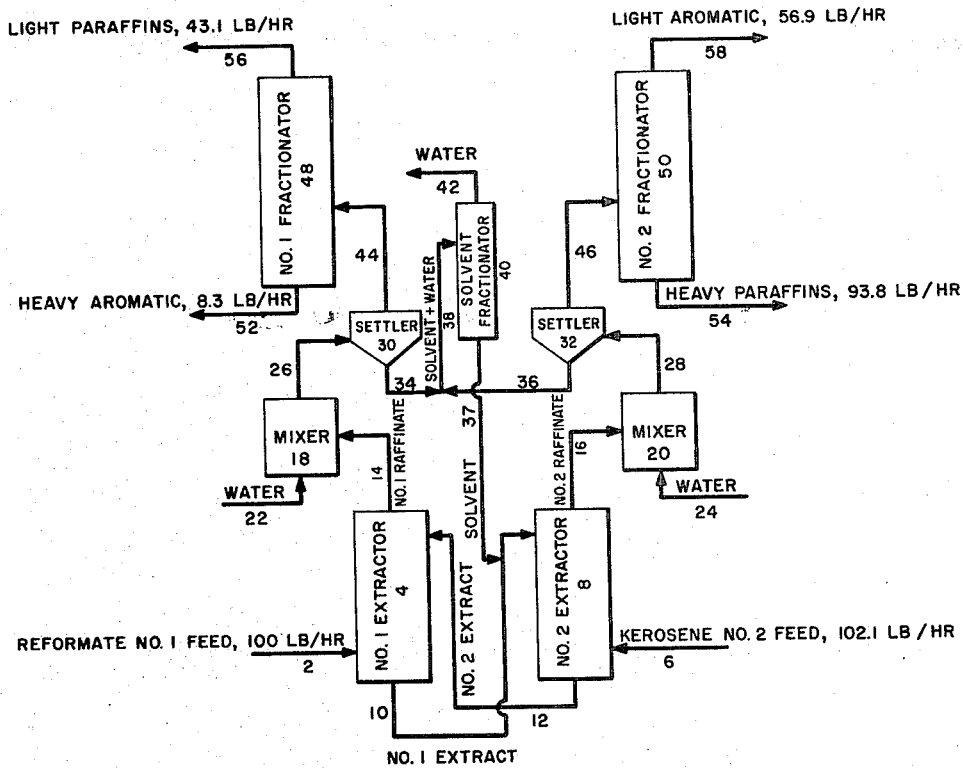
FIGS. 1 and 2 are schematic flow diagrams of embodiments of the invention.

Starting materials: Reformed naphthas, known to the art as reformate, and particularly BTX (benzene-toluene-xylene) reformates, are appropriate as one of the feed stocks for the present invention. Motor reformates are especially useful with the invention. An important feature of the invention is its ability to use reformates containing the common unsubstituted aromatic hydrocarbons, benzene and naphthalene.

The September 1966 edition of "Hydrocarbon Processing" at page 200, lists the following as some typical properties of reformate: gravity API 47.7°, initial boiling point 114° F.; end point 406° F.; research octane clear, 89.5; composition based on volume percentage, paraffin 39.1%; olefins 1.1%; naphthalene 3.4%; and aromatics 56.4%.

Reformate boiling in the range of from about 100 to about 425° F. is suitable feed material for the invention, but reformates boiling at from about 120 to about 350° F. are preferable, and reformates boiling at about 140 to about 300° F. are most preferable.

Hydrocarbons suitable for use with the second feed stock include kerosenes, i.e., petroleum fractions boiling within the range of about 300 to about 700° F., and light catalytic cycle oils (LCCO, sometimes called cycle oils, which are 400° F. to about 700° F. distillation fractions produced from the catalytic cracking of petroleum). LCCO comprises heavy aromatic-heavy paraffinic mixtures. W. L. Nelson, Petroleum Refining and Engineering, 3rd ed., McGraw-Hill Inc. (1949), page 674, describes some general properties of light catalytic cycle oils; gravity 20 to 30; characterization factor 10.6 to 11.6, or lower; boiling range 400° F. to 650° F. Also, C. Brown et al.; "Cycle Stocks From Catalytic Cracking" Industrial Engineering and Chemistry, Vol. 38, page 136 (1946) gives the characteristics of several light catalytic cycle oils from different bases.

As mentioned above, the second hydrocarbon feed stock can also be a kerosene fraction and by this is meant fractions boiling in the range of from about 300 to about 700° F., more preferably from about 350 to 650° F., and most preferably from about 400 to about 600° F., and commonly produced in the distillation of crude oil.

The above hydrocarbon feeds should be understood as not being narrowly critical and the reformates, kerosenes, and light catalytic cycle oils are merely illustrative thereof. Also, though not absolutely necessary, it is preferred that the two feed streams not overlap in their boiling ranges. In general, the process is applicable to a wide variety of hydrocarbons, and its ability to satisfactorily extract particular feeds can be readily obtained by routine trial runs. However, the primary advantage of the process is found in those hydrocarbon feed streams which contain unsubstituted aromatic hydrocarbons. The unsubstituted aromatic hydrocarbons may, of course, be present in either or both of the feed streams fed to a simultaneous extraction system such as that shown in FIG. 1 hereof and described in more detail in the aforementioned U.S. Pat. 3,539,503 to Benham, Plummer, and Norton.

Process variables: The ratio of the reformate or equivalent feed to the kerosene, LCCO, or equivalent feed, will preferably be in the range of from about 0.15 to about 6, more preferably 0.25 to about 3, and most preferably about 1 to about 2, volumes per volume.

The ratio of the #1 extract withdrawal rate to the reformate or equivalent feed rate will preferably be in the range of from about 0.5 to about 8.0, more preferably from about 1 to about 6, and most preferably from about 2 to about 4 volumes per volume.

The apparatus for use with the invention is not narrowly critical and will generally include commercially available extractors conventionally operated. Scheibel extractors, rotary disk extractors, pack towers, etc. may all be employed. The number of extraction stages required for the extraction of the particular feed stream being employed will be determined by conventional chemical engineering techniques.

Temperatures in the extraction stages will preferably be in the range of from about 40 to about 150, more preferably from about 50 to about 100, and most preferably from about 70 to about 90° F.

Temperatures in the fractionators will be conventionally determined by the feed materials utilized and the products desired.

Pressures are not narrowly critical, but should be such as to permit the process to operate in the liquid state.

Vacuum, superatmospheric distillation can be utilized if desired.

Solvents: The particular solvents utilized in the present invention have been discovered to permit the valuable advantages described above under "Utility of the Invention" to be extended to those feed materials containing substantial quantities of unsubstituted hydrocarbons which cause extractor flooding when utilized with other solvent systems.

The appropriate solvents necessarily must have a high capacity for both light aromatics and heavy aromatics, and a low capacity for light paraffins and heavy paraffins when they are mixed into two suitable feed streams. The solvents must contain from about 1 to about 40, more preferably from about 5 to about 35, and most preferably from about 10 to about 25 percent by weight of water.

Similarly, the solvents of the invention will contain preferably from about 15 to about 75, more preferably from about 20 to about 60, and most preferably from about 27 to about 44 percent by weight of tetrahydrofurfuryl alcohol. The solvents of the invention will preferably contain from about 15 to about 75, more preferably from about 25 to about 60, and most preferably from about 42 to about 55 percent by weight of tetramethylene sulfone.

The solvents of the invention may contain other conventional solvent materials which may be found useful in specialized applications, e.g., dimethylformamide, dimethylsulfoxide, ethylene glycol series, propylene glycol series, furfural, furfuryl alcohol, and phenols. However, solvents consisting essentially of tetramethylene sulfone, tetrahydrofurfuryl alcohol and water will be especially preferred.

The solvent system employed must be removable from the raffinate streams by any suitable method known to the art, as for example by water washing.

EXAMPLES

Example I (according to the invention)

Referring to FIG. 1, the solvent used consists of 47.9% by weight tetramethylene sulfone, 46.0% by weight tetrahydrofurfuryl alcohol, and 6.1% water, all calculated on a hydrocarbon free basis. The ratio of #1 extract to #1 feed is 4.29 volumes per volume. The ratio of the #1 feed to the #2 feed is 1.03 volumes per volumes.

In FIG. 1, the #1 feedstock, 100 pounds per hour of reformate (162–421° F.) comprising a mixture of light aromatic-light paraffinic hydrocarbons is introduced into extractor 4 through line 2. The #2 feedstock, 102.1 pounds per hour of a kerosene (438–498° F.) comprising a mixture of heavy aromatic-heavy paraffinic hydrocarbons is introduced into extractor 8 through line 6. The #1 extract from extractor 4, consisting essentially of a mixture of solvent and light aromatics is recycled to extractor 8 through line 10. The #2 extract from extractor 8, consisting essentially of solvent and heavy aromatics is recycled to extractor 4 through line 12. A #1 raffinate stream consisting essentially of light paraffins, heavy aromatics and a small volume of solvent (less than about 10% by weight) is withdrawn from extractor 4 through line 14, and introduced into mixer 18 which is supplied with water from line 22. A #2 raffinate stream consisting essentially of heavy paraffins, light aromatics and a small amount of solvent is withdrawn from extractor 8 through line 16 and introduced into mixer 20, which is provided with water from line 24. The #1 raffinate stream from extractor 4 is then removed via line 26 to settler 30. The #2 raffinate stream from extractor 8 is introduced into settler 32 via line 28.

The solvent and water are removed from the raffinate streams in settlers 30 and 32 through lines 34 and 36. In line 38, the solvent and water from lines 34 and 36 are introduced into solvent fractionator 40 from which water is withdrawn overhead via line 42 and the dry solvent is removed as bottoms via line 37 to mix with the #1 extract from extractor 4 which is recycled to extractor 8 through line 10.

The #1 raffinate stream from extractor 4 is removed from settler 30 through line 44 and introduced into fractionator 48, from which the heavy aromatics, 8.3 pounds per hour are removed as bottoms via line 52 and the light paraffins 43.1 pounds per hour are removed overhead via line 56. The #2 raffinate stream from extractor 8 is removed from settler 32 through line 46 and introduced into fractionator 50 from which 93.8 pounds per hour of heavy paraffins are removed as bottoms via line 54 and 56.9 pounds per hour of light aromatics are removed overhead via line 58.

Examples II through V

Figure 2:
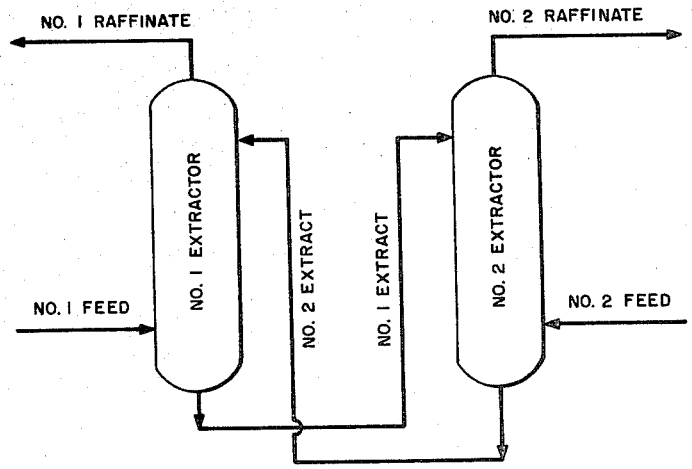

FIG. 2 shows a detail of extractor 4 and extractor 8 of the same extraction system shown complete in FIG. 1. In the examples which follow, the tabulated compositions and flow rates are introduced into extractor #1 and extractor #2 and the tabulated amounts of each stream are withdrawn.

EXAMPLE II.—COMPARATIVE

|  | Components | | | |
|---|---|---|---|---|
|  | Benzene | n-Hexane | 1-methyl-naphthalene | n-Undecane |
| #1 feed, lb./hr | 225.0 | 225.0 | | |
| #2 feed, lb./hr | | | 257.5 | 257.5 |
| #1 raffinate, lb./hr | Not measurable—#1 extractor flooded | | | |
| #2 raffinate, lb./hr | Not measured | | | |
| #1 extract rate, lb./hr | 3,890 | | | |
| #2 extract rate, lb./hr | 3,890 | | | |
| #1 and #2 extract compositions, wt. percent | Hydrocarbon free basis 45.0 sulfolane plus 45.0 dimethyl-formamide plus 10.0 water | | | |
| Extractor temperatures, ° F | 100 | | | |
| Number of extraction stages | 11 in each extractor | | | |

Comments.—#1 extractor flooded, i.e., #1 feed could not pass up through #2 extractor. Aromatics contents o extracts too high resulting too low extract density.

EXAMPLE III.—COMPARATIVE

|  | Components | | | |
|---|---|---|---|---|
|  | Mixed xylenes | n-Octane | 1,2,4 trimethyl-benzene | n-Nonane |
| #1 feed, lb./hr | 246.0 | 254.0 |  |  |
| #2 feed, lb./hr |  |  | 265.5 | 255.0 |
| #1 raffinate, lb./hr | 73.6 | 220.3 | 199.1 | 2.5 |
| #2 raffinate, lb./hr | 172.4 | 33.7 | 66.4 | 252.5 |
| #1 extract rate, lb./hr | 4.136 |  |  |  |
| #2 extract rate, lb./hr | 4.136 |  |  |  |
| #1 and #2 extract compositions, wt. percent | Hydrocarbon free basis 42.8 sulfolane plus 45.9 dimethyl-formamide plus 11.3 water | | | |
| Extractor temperatures, °F | 96 | | | |
| Number of extraction stages | 11 in each extractor | | | |

Comments.—Good extractor performance.

EXAMPLE IV.—ACCORDING TO THE INVENTION

|  | Components | | | |
|---|---|---|---|---|
|  | Benzene | n-Hexane | Mixed dimethyl naphthalenes | n-Dodecane |
| #1 feed, lb./hr | 268.6 | 273.0 |  |  |
| #2 feed, lb./hr |  |  | 286.0 | 306.0 |
| #1 raffinate, lb./hr | 94.0 | 225.2 | 147.6 | 11.3 |
| #2 raffinate, lb./hr | 174.6 | 47.8 | 138.4 | 294.7 |
| #1 extract rate, lb./hr | 3.173 |  |  |  |
| #2 extract rate, lb./hr | 3.163 |  |  |  |
| #1 and #2 extract compositions, wt. percent | Hydrocarbon free basis 41.5 sulfolane plus 40.6 tetrahydrofurfural alochol plus 17.9 water | | | |
| Extractor temperatures, °F | 113 | | | |
| Number of extraction stages | 11 in each extractor | | | |

Comments.—Good extractor performance.

EXAMPLE V.—ACCORDING TO THE INVENTION

|  | Components | | | |
|---|---|---|---|---|
|  | p-Xylene | Isooctane | Sec-butyl benzene | n-Decane |
| #1 feed, lb./hr | 271.8 | 272.8 |  |  |
| #2 feed, lb./hr |  |  | 282.9 | 283.4 |
| #1 raffinate, lb./hr | 135.6 | 255.1 | 73.8 | 6.5 |
| #2 raffinate, lb./hr | 136.2 | 17.7 | 209.1 | 276.9 |
| #1 extract rate, lb./hr | 3.293 |  |  |  |
| #2 extract rate, lb./hr | 3.237 |  |  |  |
| #1 and #2 extract compositions, wt. percent | Hydrocarbon free basis 43.6 sulfolane plus 41.3 tetrahydrofurfuryl alcohol plus 15.1 water | | | |
| Extractor temperatures, °F | 96 | | | |
| Number of extraction stages | 11 in each extractor | | | |

Comments.—Good extractor performance.

Examples IV and V show that the tetramethylene sulfone-tetrahydrofurfural alcohol-water solvents of the present invention provide good extractions of both substituted and unsubstituted aromatic hydrocarbons. In contrast, Examples II and III show that a tetramethylene sulfone-dimethylformamide-water solvent system does not generally provide good extraction of hydrocarbon feed streams containing unsubstituted aromatic hydrocarbons.

Modifications of the invention

This invention is capable of variety of modifications and variations which will be made apparent to those skilled in the art by a reading of the specification and which are to be included within the spirit of the claims appended hereto.

What is claimed is:

1. In a simultaneous, dual extraction process utilizing two separate hydrocarbon feed streams, at least one of said feed streams comprising unsubstituted aromatic hydrocarbons, said extraction process yielding at least one product stream enriched in unsubstituted aromatic hydrocarbons, the improvement comprising utilizing as extraction solvent a mixture comprising tetramethylene sulfone, tetrahydrofurfuryl alcohol, and from about 1 to about 40% by weight of water.

2. A simultaneous, dual extraction process utilizing two separate hydrocarbon feeds, at least one of said feeds containing unsubstituted aromatic hydrocarbons, a first feed comprising a mixture of light aromatic hydrocarbons with light paraffin hydrocarbons, and a second feed comprising a mixture of heavy aromatic hydrocarbons with heavy paraffin hydrocarbons; said extraction process yielding as product streams, a light aromatic product stream, a heavy aromatic product stream, a light paraffinic product stream, and a heavy paraffinic product stream; said process comprising in combination the steps of:

(a) feeding to a first extractor said light aromatic-light paraffinic mixture, (b) feeding to said first extractor an extract stream comprising a mixture of heavy aromatics and a solvent comprising tetrahydrofurfuryl alcohol, tetramethylene sulfone, and from about 1 to about 40% by weight of water, (c) withdrawing from said first extractor an extract consisting essentially of a mixture of said solvent with at least a portion of said light aromatics, (d) withdrawing from said first extractor a first raffinate stream consisting essentially of light paraffins, heavy aromatics and a small amount of solvent, (e) feeding said extract stream from said first ex-extractor into a second extractor, (f) feeding to said second extractor said heavy aromatic-heavy paraffinic mixture, (g) withdrawing from said second extractor a second extract stream consisting essentially of said solvent and at least a portion of said heavy aromatics, (h) withdrawing from said second extractor a second raffinate stream consisting essentially of said heavy paraffins, said light aromatics and a small amount of solvent, (i) feeding said second extract stream consisting of the solvent and at least a portion of said heavy aromatics, to said first extractor, (j) removing any entrained solvent from said first raffinate stream, (k) removing any entrained solvent from said second raffinate stream, (l) distilling said first raffinate stream to separate said light paraffins from said heavy aromatics, (m) distilling the second raffinate stream to separate said heavy paraffins from said light aromatics.

3. The process of claim 2 wherein the solvent is removed from said raffinates by water washing.

4. The process of claim 1 wherein the solvent comprises from about 15 to about 75% by weight of tetramethylene sulfone, from about 15 to about 75% by weight of tetrahydrofurfuryl alcohol, and from about 1 to about 40% by weight of water.

5. The process of claim 2 wherein the solvent comprises from about 15 to about 75% by weight of tetramethylene sulfone, from about 15 to about 75% by weight of tetrahydrofurfuryl alcohol, and from about 1 to about 40% by weight of water.

6. A process according to claim 2 wherein the ratio of said light aromatic-light paraffinic feed to said heavy aromatic-heavy paraffinic feed is in the range of from about 0.15 to about 6 volumes per volume.

7. A process according to claim 2 wherein the ratio of the extract from said first extractor to the light aromatic-light paraffinic mixture feed to said first extractor is from about 0.5 to about 8.0 volumes per volume.

8. A process according to claim 1 wherein the temperature in the extraction stages is within the range of from about 40 to 150° F.

9. A process according to claim 2 wherein the temperature in the extraction stages is in the ranges of from about 40 to about 150° F.

10. A process according to claim 1 wherein one of said hydrocarbon feed streams comprises reformate containing hydrocarbons boiling in the range of from about 100 to about 425° F. and wherein the other of said feeds contains light catalytic cycle oils or kerosenes and boils in the range of from about 320 to about 700° F.

11. A process according to claim 2 wherein one of said hydrocarbon feed streams comprises reformate containing hydrocarbons boiling in the range of from about 100 to about 425° F. and wherein the other of said feeds contains light catalytic cycle oils or kerosenes and boils in the range of from about 320 to about 700° F.

References Cited
UNITED STATES PATENTS

| | | | |
|---|---|---|---|
| 2,671,753 | 3/1954 | Lillard | 208—327 |
| 3,317,422 | 5/1967 | Benham | 208—317 |
| 3,539,503 | 11/1970 | Benham et al. | 208—317 |
| 3,539,504 | 11/1970 | Cummins | 208—327 |
| 3,567,626 | 3/1971 | Bozeman et al. | 208—327 |

DELBERT E. GANTZ, Primary Examiner

C. E. SPRESSER, JR., Assistant Examiner

U.S. Cl. X.R.

208—325, 327; 260—674 SE